(12) United States Patent
Mulet Valles (10) Patent No.: US 9,708,130 B2
(45) Date of Patent: Jul. 18, 2017

(54) MACHINE FOR SUPPLYING CONTAINERS

(71) Applicant: Tomas Mulet Valles, Matadepera (ES)

(72) Inventor: Tomas Mulet Valles, Matadepera (ES)

( * ) Notice: Subject to any disclaimer, the term of this patent is extended or adjusted under 35 U.S.C. 154(b) by 0 days.

(21) Appl. No.: 15/029,768

(22) PCT Filed: Oct. 21, 2014

(86) PCT No.: PCT/EP2014/072490
§ 371 (c)(1),
(2) Date: Apr. 15, 2016

(87) PCT Pub. No.: WO2015/059112
PCT Pub. Date: Apr. 30, 2015

(65) Prior Publication Data
US 2016/0229642 A1 Aug. 11, 2016

(30) Foreign Application Priority Data

Oct. 21, 2013 (ES) .................................. 201331549

(51) Int. Cl.
| | |
|---|---|
| *B65G 47/14* | (2006.01) |
| *B65G 47/248* | (2006.01) |
| *B65G 47/256* | (2006.01) |

(52) U.S. Cl.
CPC ..... *B65G 47/1471* (2013.01); *B65G 47/1492* (2013.01); *B65G 47/248* (2013.01); *B65G 47/256* (2013.01); *B65G 2201/0244* (2013.01)

(58) Field of Classification Search
CPC .................................................. B65G 47/1471
See application file for complete search history.

(56) References Cited

U.S. PATENT DOCUMENTS

| 3,392,815 A | * | 7/1968 | Skeels, Sr. | ......... B65G 47/1471 |
| | | | | 198/388 |
| 3,658,167 A | * | 4/1972 | Zabroski | ............ B65G 47/1471 |
| | | | | 198/388 |

(Continued)

FOREIGN PATENT DOCUMENTS

| DE | 3718481 A1 | 12/1988 |
|---|---|---|
| EP | 0590774 A1 | 4/1994 |
| EP | 1582484 A1 | 10/2005 |

OTHER PUBLICATIONS

International Search Report dated Feb. 5, 2015 for PCT/EP2014/072490.

*Primary Examiner* — Thomas Randazzo
(74) *Attorney, Agent, or Firm* — Lucas & Mercanti, LLP (57) ABSTRACT

A machine for supplying containers that comprises: a hopper (10) configured to contain a plurality of containers (100) arranged randomly; a transfer station (20); and a first elevator (30) that has first horizontal blades (31) longitudinally, each of said first blades (21) being configured to collect a first container (101) from the hopper (10) and lift the same in a horizontal position to the transfer station (20). Said machine (1) comprises a second elevator (40), parallel to the first elevator (30), that has second horizontal blades (41) longitudinally, each of said second blades (41) being configured to collect a second container (102) from the hopper (10) and lift the same in a horizontal position to the transfer station (20); and an alignment station (50) configured to receive the first (101) and second containers (102) coming from the transfer station (20) and supply the same horizontally in an aligned manner.

15 Claims, 10 Drawing Sheets

(56) References Cited

U.S. PATENT DOCUMENTS

| | | | | |
|---|---|---|---|---|
| 3,797,640 | A | * | 3/1974 | Aidlin ................ B65G 47/1471 198/380 |
| 4,651,864 | A | * | 3/1987 | Nipoti ................ B65G 47/1471 198/397.01 |
| 4,898,270 | A | * | 2/1990 | Hopkins ............ B65G 47/1471 198/390 |
| 5,236,077 | A | * | 8/1993 | Hoppmann ........ B65G 47/1471 198/380 |
| 6,199,702 | B1 | * | 3/2001 | Buer ....................... B03B 9/061 209/12.1 |
| 7,222,719 | B2 | * | 5/2007 | Shackelford ....... B65G 47/1457 198/443 |
| 7,228,955 | B2 | * | 6/2007 | Comas Corral ... B65G 47/1478 198/526 |
| 7,743,904 | B2 | * | 6/2010 | Monti ................ B65G 47/1471 198/395 |
| 2004/0011623 | A1 | * | 1/2004 | Sala ................... B65G 47/1471 198/373 |

* cited by examiner

MACHINE FOR SUPPLYING CONTAINERS

CROSS REFERENCE TO RELATED APPLICATION

This Application is a 371 of PCT/EP2014/072490 filed on Oct. 21, 2014, which, in turn, claimed the priority of Spanish Patent Application No. 201331549 filed on Oct. 21, 2013, both applications are incorporated herein by reference.

FIELD OF THE INVENTION

The present invention relates to a machine for supplying containers that is configured to collect a plurality of containers arranged randomly inside a hopper and to transfer said containers in an orderly manner to a subsequent step of processing or manipulation thereof. Said machine being especially designed to increase the frequency of transfer and/or supply of said containers.

The present invention is applicable to any type of process in general, and more particularly to packaging, screen-printing or labeling processes, wherein once the containers are transferred, the same are positioned according to a pre-established position thereof which makes it possible for them to face the subsequent steps of the process.

BACKGROUND OF THE INVENTION

In general, the machines for supplying containers usually have a feed hopper wherein the containers are deposited in a disorganized manner either through manual or automatic means. Thus, containers are randomly contained inside the hopper, waiting to be collected for their subsequent transfer in an orderly manner to a subsequent step of processing or manipulation thereof.

Document EP1582484 shows a machine of these characteristics in which, once transferred, the containers are positioned according to a pre-established position thereof. To achieve the foregoing, said machine comprises an elevator that has horizontal blades longitudinally, where each of said blades is configured to collect a container from the hopper and lift it in a horizontal position to a transfer station. Said transfer station transfers the containers arriving from the elevator towards a positioning station, configured to leave said containers in a vertical position, supported on their base and leaving their neck at the upper end. The foregoing makes it possible for said containers to face subsequent packaging, screen-printing and/or labeling steps.

The main inconvenience of this type of machines lies in their supply capacity or work regime. That is to say, the number of containers it can supply per unit of time. Specifically, it is usual within the same work cycle for several blades not to be able to collect their corresponding container from the hopper, and therefore to be empty, which is mainly due to the random arrangement of the containers contained in the hopper and also due to the configuration of the blades itself. The consequence of the foregoing is that this type of machine is generally unable to achieve a desired or optimal work regime.

The present invention solves the aforementioned problem thanks to a configuration of the feeding means and the presence of an alignment station, which make it possible to increase said supply frequency, the foregoing with the maximum degree of reliability and security and without having to give up a simple and economical design that is easy to use and maintain.

DESCRIPTION OF THE INVENTION

The invention relates to a machine for supplying containers according to claim 1. The preferred embodiments of the machine are defined in the dependent claims.

The machine for supplying containers of the present invention is of the type that comprises the following:

- a hopper configured to contain a plurality of containers arranged randomly;
- a transfer station; and
- a first elevator that has first horizontal blades longitudinally, each of said first blades being configured to collect a first container from the hopper and lift the same in a horizontal position to the transfer station.

Said machine is characterized in that it comprises:

- a second elevator, parallel to the first elevator, that has second horizontal blades longitudinally, each of said second blades being configured to collect a second container from the hopper and lift the same in a horizontal position to the transfer station; and
- an alignment station configured to receive the first and second containers coming from the transfer station and supply the same horizontally in an aligned manner.

With the foregoing the number of containers supplied per unit of time rises, increasing the number of collecting blades per work cycle and achieving the correct alignment of the containers to face a subsequent packaging, screen-printing and/or labeling step or even the direct release or wrapping thereof at the same time. The number of blades can even be increased by adding a third, fourth and successive elevators.

The hopper, together with the elevator, constitutes one of the basic elements forming the feeding means of the machine. Its objective is to contain the maximum number of containers, or the optimal number for the correct operation of the machine, in addition to making it possible for said containers to enter into contact with the first and second elevator for the collection thereof. Another of its functions is to facilitate the replenishment of containers, which may be deposited manually or automatically, as the same are collected by the elevator. Finally, its design must also make it possible for the containers to move smoothly in order to ensure the collection thereof by the elevators, avoiding potential obstruction areas that block the passage of the containers as well as potential stagnation areas that permanently accumulate a certain number thereof without the possibility of being collected. In that sense, the hopper allows different construction configurations, and may be configured by means of two or more receptacles, either contiguous or separate, and can also have automatic transport means (conveyor belts, etc.), mechanical rerouting means (decanting ramps, diverter panels, etc.), and even mechanical anti-stagnation means (rollers, vibration devices, etc.).

Preferably, the hopper comprises the following:

- a supply receptacle configured to supply containers to the first and second elevator; and
- a replenishment receptacle configured to supply containers to the supply receptacle.

The containers deposited in the replenishment receptacle are transferred to the supply receptacle by means of a motorized conveyor belt, also having a steering panel that causes the drop of the containers into the supply receptacle.

The width of the elevator, and more specifically of the blades comprised by the same, is designed to be able to work with a large variety of containers, regardless of shape and size. However, under optimal operating conditions of the machine, it is convenient for each blade to be able to lift a single container per work cycle, making it necessary to adapt said width depending on the type of container to be manipulated. To achieve the foregoing, the first elevator comprises a first separator configured to partially cover the first blades and establish a first effective collection width thereof, while the second elevator comprises a second separator configured to partially cover the second blades and establish a second effective collection width. Said first and second effective collection widths are established such that each of them is lower than twice the length of the container itself. Preferably there is also a central barrier arranged between the first elevator and the second elevator.

As provided above, the containers are lifted in a horizontal position. To avoid the collection thereof in a vertical position, the longitudinal distance among consecutive blades must also be established in order for it never to be greater than the length of the container itself, forcing the container to enter between two consecutive blades horizontally. To achieve the foregoing, the blades have an extractable configuration and fast assembly/disassembly attachment means that work in collaboration with hooking means arranged in the elevators in multiple positions thereof.

Preferably, the first and second blades are flexible, configured in the form of a claw by first spikes and second spikes, respectively. The foregoing avoids the blockage or occasional entrapment among the containers dragged by the blades and any other element of the machine close to the same. If that happens, the container is released on its own thanks to the flexibility of the blades.

Preferably, the transfer station comprises a holdback screen configured to hold back the forward motion of a first and a second container, respectively delivered by a first and a second blade. Thus, the first and/or the second container recently delivered by a first and/or a second blade is momentarily held back waiting for the first and/or the second container delivered just prior to be removed. That is to say, a certain spacing is maintained at all times during the transfer process among the containers being delivered, preventing the same from entering into contact with the containers that have been delivered just prior.

Preferably, the transfer station comprises an upper control plate, which height may be adjusted, configured to establish a height of passage of the first and second containers towards the alignment station. The foregoing prevents any of the containers from being occasionally ejected after passing through the holdback screen.

Preferably, the transfer station comprises a horizontal transporter, which in turn has a plurality of pushing fins arranged in parallel with respect to the first and second blades. The pushing fins are configured to rotate perimetrally around the transporter and to pass below the upper control plate, which may also be assembled in the transporter, making possible the collection of a first and a second container coming from the holdback screen and the transfer thereof along the alignment station. Both the upper control plate and the pushing fins have an extractable configuration and are interchangeable with other plates and/or fins with different configurations and sizes, having guiding and attachment means that allow the fast extraction and subsequent assembly thereof to achieve the foregoing.

The alignment station comprises an inner wall and an outer wall that are opposite to each other and delimit a width of passage of the first and second containers, where said width of passage decreases from an entry area that is connected to the transfer station as far as an exit area that allows the passage of a single first or second container. This way, at the end of the exit area, the first and second containers form a line one by one, arranged horizontally one after the other.

The position of the first blades with respect to the second blades determines the existence or absence of the rejection of containers in said alignment phase thereof.

According to a first preferred embodiment of the machine, the first blades are horizontally aligned with respect to the second blades. That is to say, their position in height matches. This first embodiment generates the rejection of containers whenever the same pushing fin collects a first and a second container simultaneously. Whenever this happens, given that the width of passage decreases until it allows the passage of a single container, one of the two containers must be rejected.

In order to recover the rejected containers, the machine comprises a recovery station, which in turn has:
 a recovery ramp attached to the alignment station; and
 a recovery elevator configured to receive a first or a second container coming from the recovery ramp and return it to the hopper.

Said recovery ramp slopes down from an opening in the outer wall, located before the exit area, and ends at a recovery receptacle configured to supply the recovery elevator.

According to a preferred second embodiment of the machine, the first blades alternate horizontally with respect to the second blades. That is to say, their position in height does not match. This second embodiment does not generate the rejection of containers, given that the same pushing fin can never collect a first and a second container simultaneously. The foregoing is because the delivery of containers of the first and the second blades is carried out in an alternate manner.

According to a preferred case of application, the present invention is integrated and/or constitutes in itself a machine for positioning containers. To achieve the foregoing, the machine comprises a positioning station arranged at the end of the alignment station, configured to position the first and second containers in a vertical position and aligned on an output conveyor belt.

BRIEF DESCRIPTION OF THE DRAWINGS

Next, a series of drawings will be very briefly described, which facilitate the comprehension of the invention and are expressly related to two embodiments of said invention presented as non-limiting examples thereof.

DETAILED DESCRIPTION OF THE INVENTION

Figure 1:
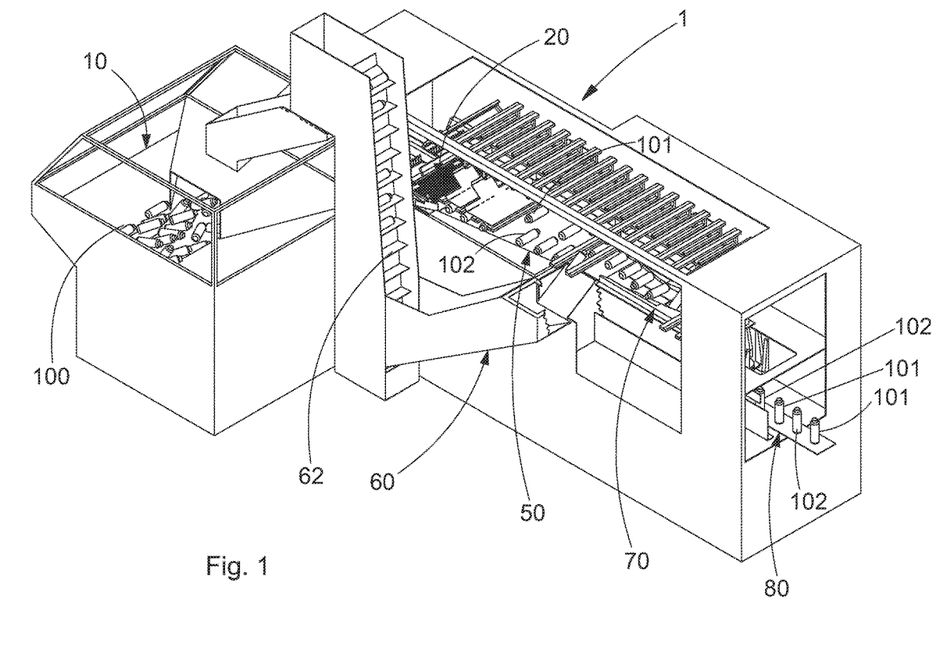
FIG. 1 represents a general perspective view of the machine of the present invention according to a first preferred embodiment.
Figure 2:
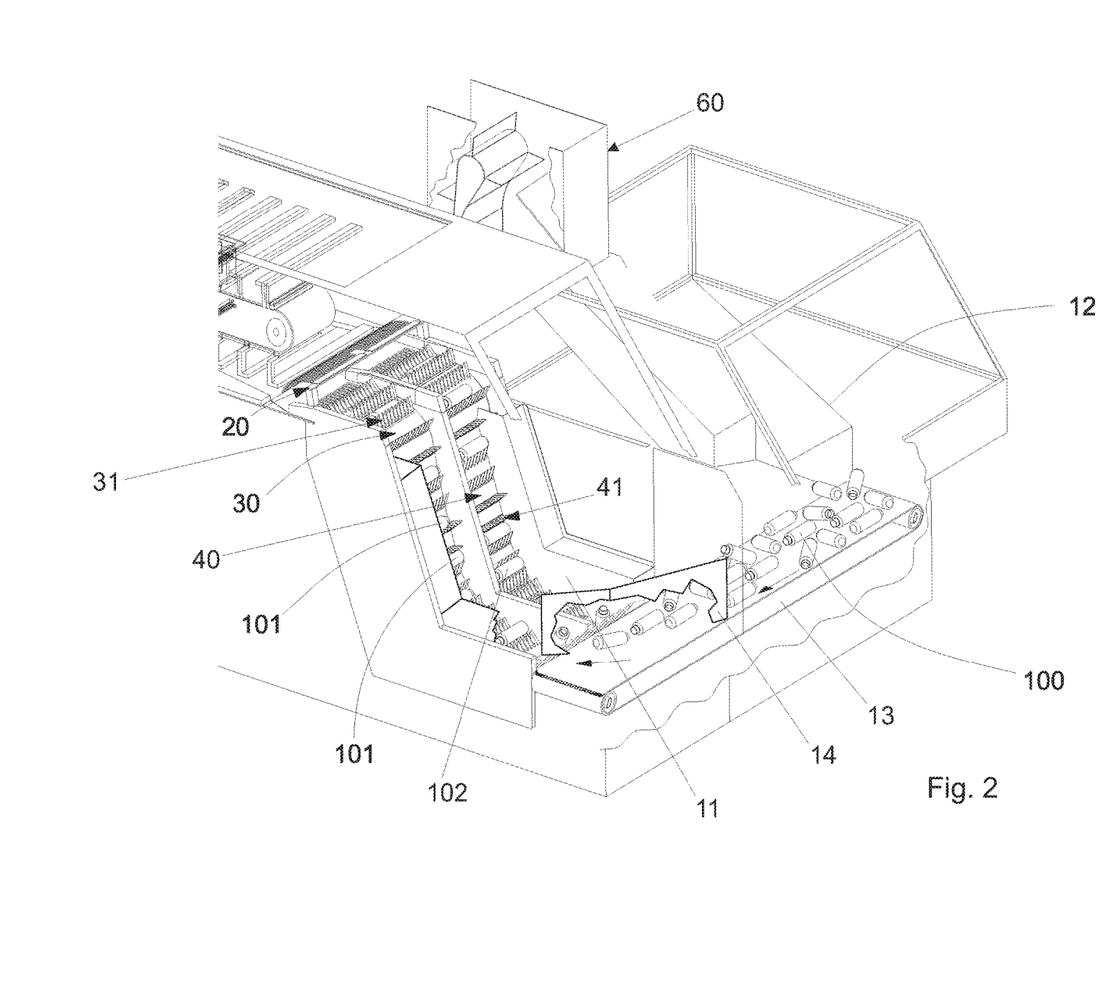
FIG. 2 represents a rear perspective view of the machine of the present invention according to a first preferred embodiment.

FIGS. 1 and 2 respectively show a general and a rear perspective view of the machine (1) of the present invention according to a first preferred embodiment. As shown therein, the machine comprises the following:

- a hopper (10) configured to contain a plurality of containers (100) arranged randomly;
- a transfer station (20); and
- a first elevator (30) that has first horizontal blades (31) longitudinally, each of said first blades (21) being configured to collect a first container (101) from the hopper (10) and lift the same in a horizontal position to the transfer station (20).

Said machine is characterized in that it comprises:

- a second elevator (40), parallel to the first elevator (30), that has second horizontal blades (41) longitudinally, each of said second blades (41) being configured to collect a second container (102) from the hopper (10) and lift the same in a horizontal position to the transfer station (20); and
- an alignment station (50) configured to receive the first (101) and second containers (102) coming from the transfer station (20) and supply the same horizontally in an aligned manner.

As shown therein, the hopper (10) comprises the following:

- a supply receptacle (11) configured to supply containers (100) to the first (30) and second elevator (40); and
- a replenishment receptacle (12) configured to supply containers (100) to the supply receptacle (11).

The containers (100) deposited in the replenishment receptacle (12) are transferred to the supply receptacle (11) by means of a motorized conveyor belt (13), also having a steering panel (14) that causes the drop of the containers (100) into the supply receptacle (11).

Figure 3:
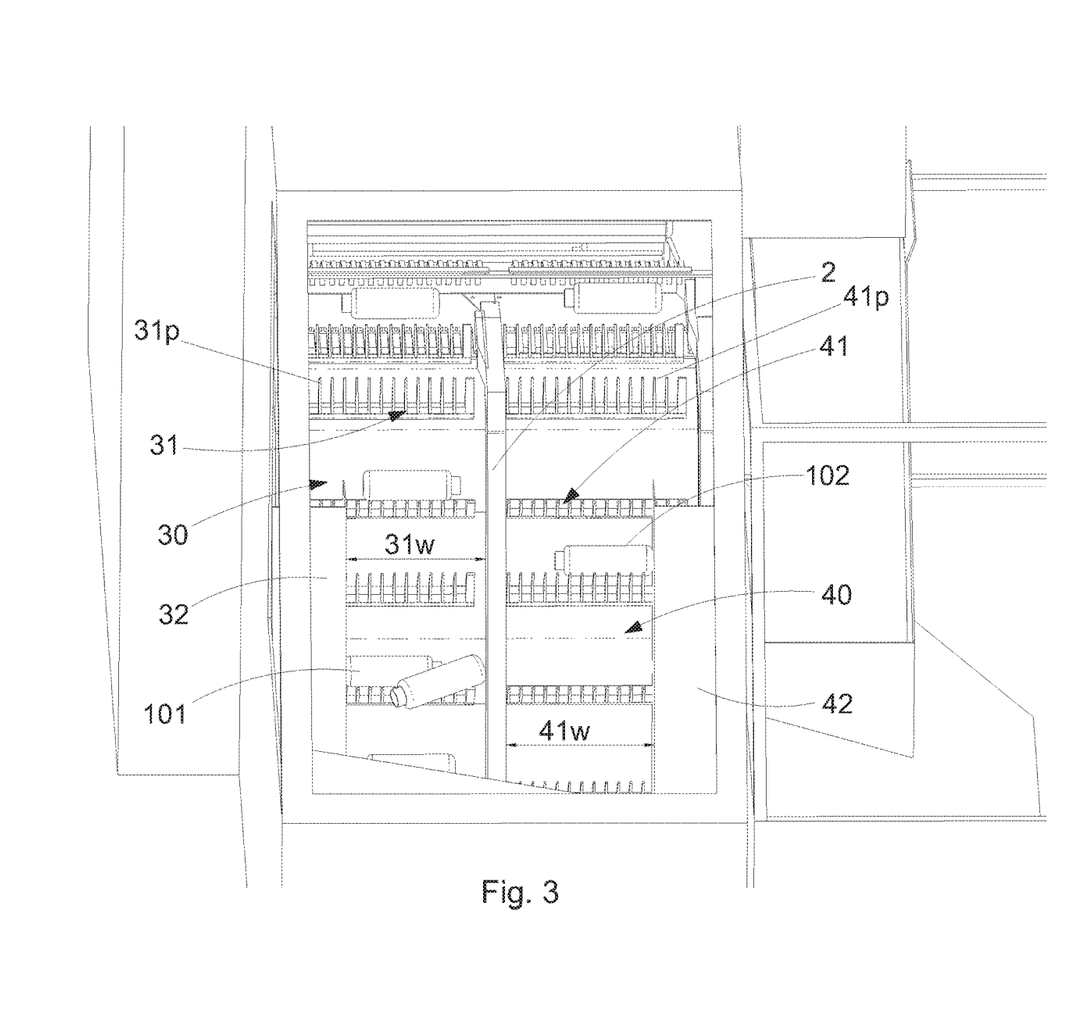
FIG. 3 represents a perspective view of the first and second elevator according to a first preferred embodiment.

FIG. 3 shows a perspective view of the first (30) and second elevator (40) according to the first preferred embodiment. As shown therein, the first elevator (30) comprises a first separator (32) configured to partially cover the first blades (31) and establish a first effective collection width (31w) thereof, while the second elevator (40) comprises a second separator (42) configured to partially cover the second blades (41) and establish a second effective collection width (41w). Said first (31w) and second effective collection widths (41w) are established such that each of them is lower than twice the length of the container itself, noting that two containers (101, 102) do not fit in the same blade (31, 41) simultaneously. Likewise, there is also a central barrier (2) arranged between the first elevator (30) and the second elevator (40).

The first (31) and second blades (41) are flexible, configured in the form of a claw by first spikes (31p) and second spikes (41p), respectively.

According to this first preferred embodiment, the first blades (31) are horizontally aligned with respect to the second blades (41). That is to say, their position in height matches.

Figure 4:
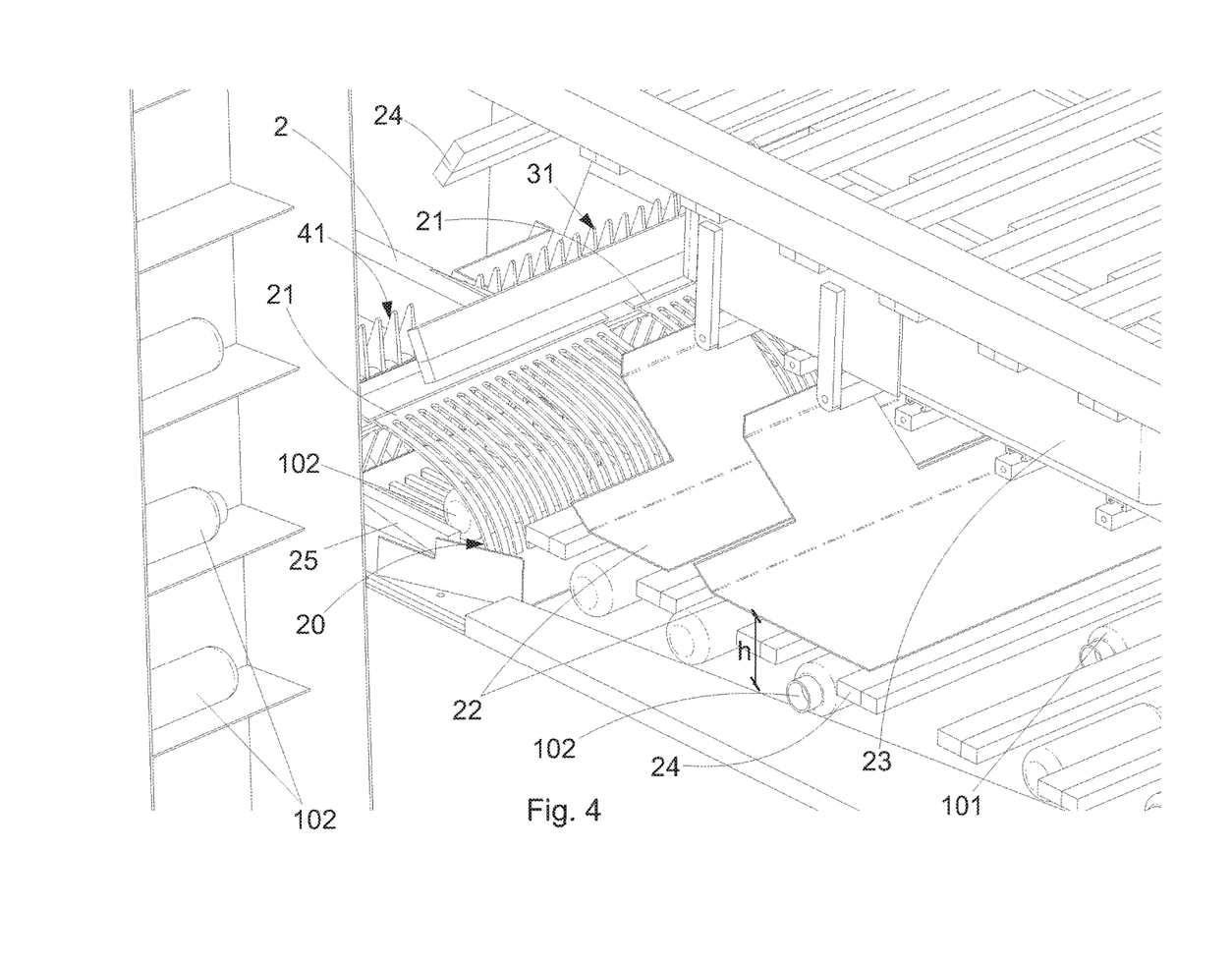
FIG. 4 represents a perspective view of the transfer station according to a first preferred embodiment.

FIG. 4 shows a perspective view of the transfer station (20) according to the first preferred embodiment. As shown therein, the transfer station (20) comprises a holdback screen (21) configured to hold back the forward motion of a first (101) and a second container (102), respectively delivered by a first (31) and a second blade (41). Said containers (101, 102) roll freely along a transfer ramp (25) that goes downwards in the forward direction, to be held at the holdback screen waiting for the blades (31, 41) to push them forward a brief moment later. Thus, the first (101) and/or the second container (102) recently delivered by a first (31) and/or a second blade (41) is momentarily held back, long enough, waiting for the first (101) and/or the second container (102) delivered just prior to be removed. That is to say, as shown therein, a certain spacing is maintained during the transfer process among the containers being delivered, preventing the same from entering into contact with the containers that have been delivered just prior.

The transfer station (20) comprises an upper control plate (22), which height may be adjusted, configured to establish a height of passage (h) of the first (101) and second containers (102) towards the alignment station (50). The foregoing prevents any of the containers (101, 102) from being occasionally ejected after passing through the holdback screen (21).

Likewise, the transfer station (20) comprises a horizontal transporter (23), which in turn has a plurality of pushing fins (24) arranged in parallel with respect to the first (31) and second blades (41). The pushing fins (24) are configured to rotate perimetrally around the transporter (23) and to pass below the upper control plate (22), which is also assembled in the transporter (23), making possible the collection of a first (101) and a second container (102) coming from the holdback screen (21) and the transfer thereof along the alignment station (50). Both the upper control plate (22) and the pushing fins (24) have an extractable configuration and are interchangeable with other plates and/or fins with different configurations and sizes, having guiding and attachment means that allow the fast extraction and subsequent assembly thereof to achieve the foregoing.

Figure 5:
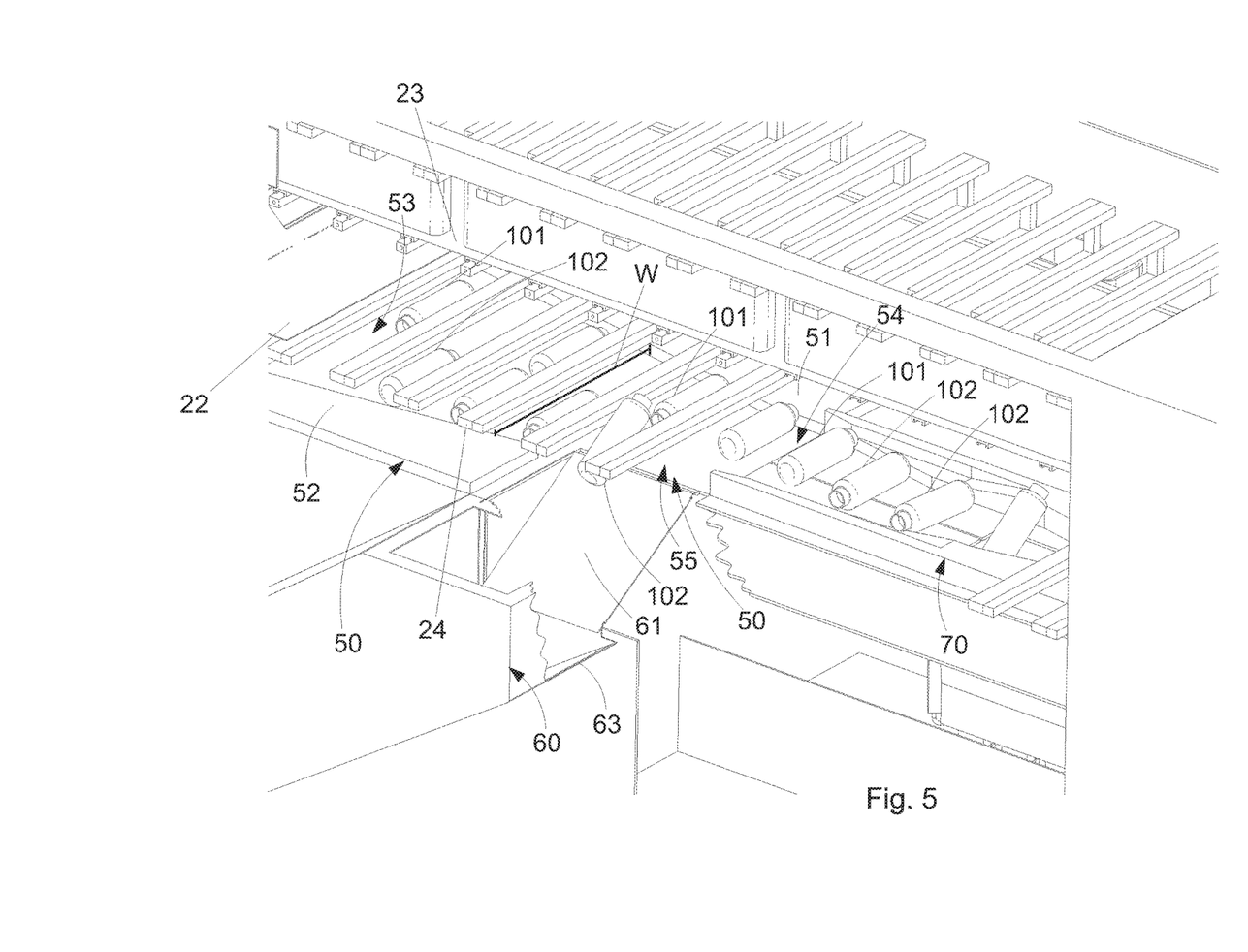
FIG. 5 represents a perspective view of the alignment station according to a first preferred embodiment.

FIG. 5 shows a perspective view of the alignment station (50) according to the first preferred embodiment. Some of the pushing fins (24) have not been illustrated for greater clarity. As shown therein, the alignment station (50) comprises an inner wall (51) and an outer wall (52) that are opposite to each other and delimit a width of passage (w) of the first (101) and the second containers (102), where said width of passage (w) decreases from an entry area (53) that is connected to the transfer station (20) as far as an exit area (54) that allows the passage of a single first (101) or second container (102). This way, at the end of the exit area, the first (101) and second containers (102) form a line one by one, arranged horizontally one after the other.

This first embodiment generates the rejection of containers (101, 102) whenever the same pushing fin (24) collects a first (101) and a second container (102) simultaneously. Whenever this happens, given that the width of passage (w) decreases until it allows the passage of a single container (101, 102), one of the two containers must be rejected.

In order to recover the rejected containers (101, 102), the machine comprises a recovery station (60), which in turn has:

- a recovery ramp (61) attached to the alignment station (50); and
- a recovery elevator (62) configured to receive a first (101) or a second container (102) coming from the recovery ramp (61) and return it to the hopper (10).

Said recovery ramp (61) slopes down from an opening (55) in the outer wall (52), located before the exit area (54), and ends at a recovery receptacle (63) configured to supply the recovery elevator (62). Given the position of the recovery station (60), located at one of the longitudinal sides of the machine (1), in this case only the second containers (102) are rejected because they are nearer to said side. As shown in FIGS. 1 and 2, the recovered containers (102) are sent to the replenishment receptacle (1) directly.

The machine (1) comprises a positioning station (70) arranged at the end of the alignment station (50), FIG. 1, configured to position the first (101) and second containers (102) in a vertical position and aligned on an output conveyor belt (80). The containers (101, 102) are supported on their base and leave their neck at the upper end.

Figure 6:
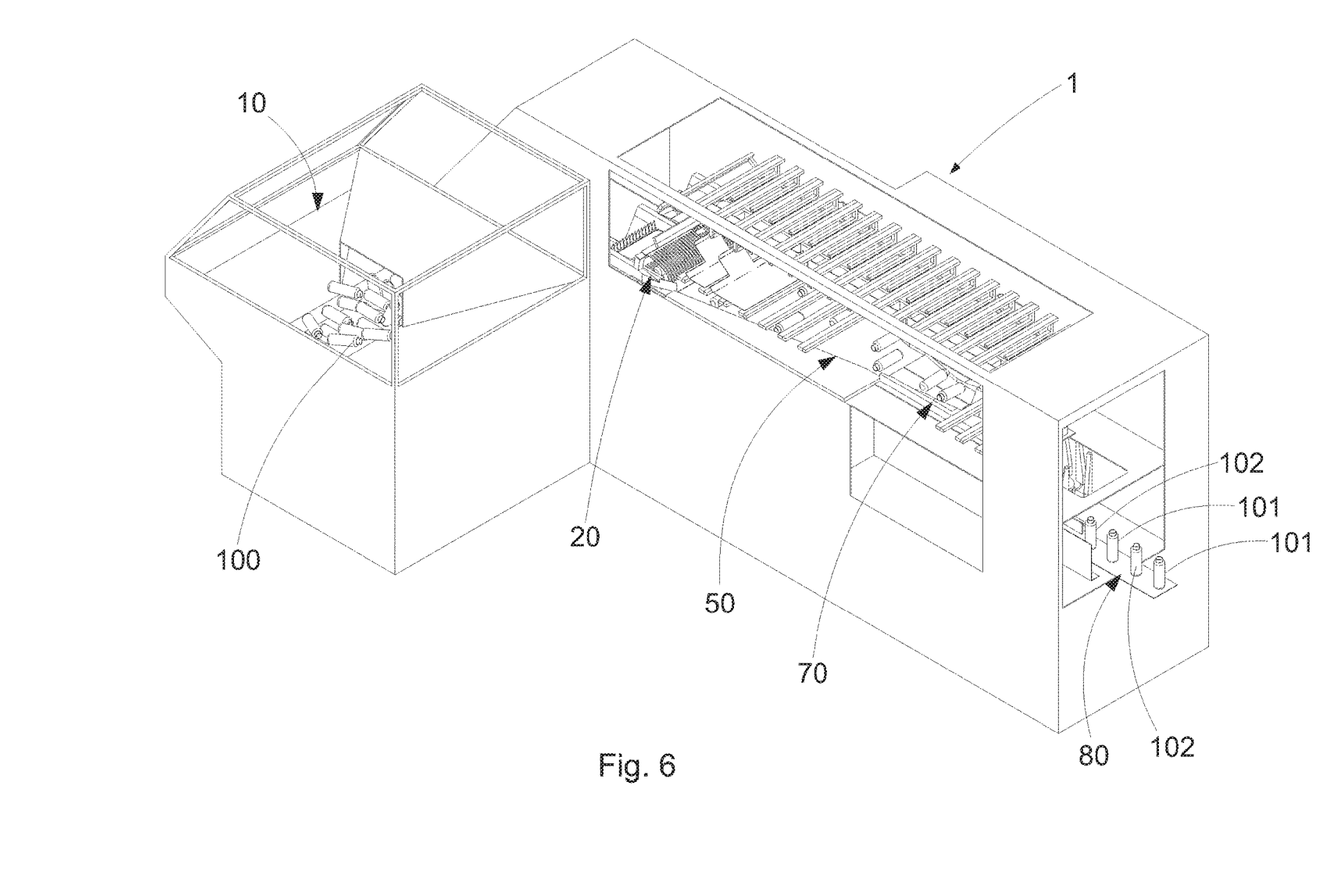
FIG. 6 represents a general perspective view of the machine of the present invention according to a second preferred embodiment.
Figure 7:
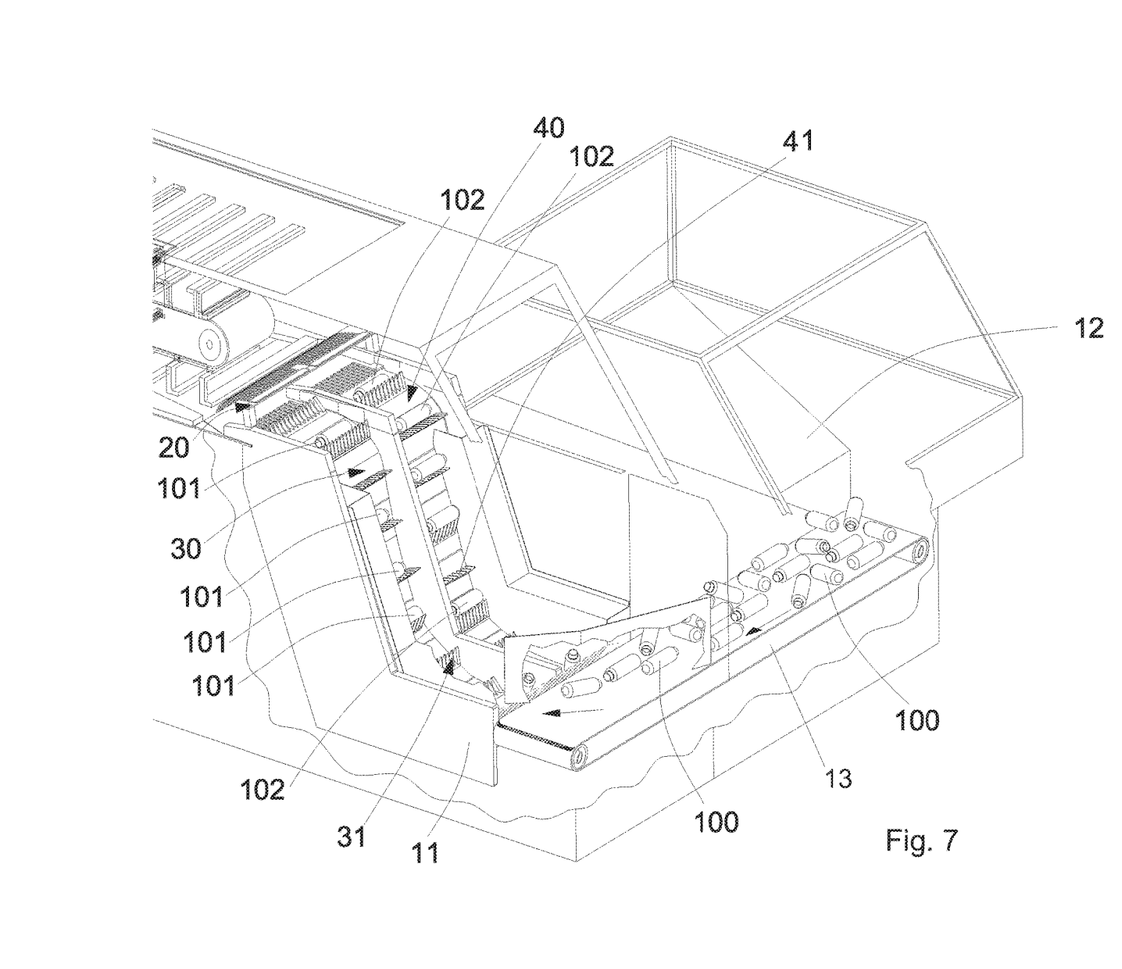
FIG. 7 represents a rear perspective view of the machine of the present invention according to a second preferred embodiment.

FIGS. 6 and 7 respectively show a general and a rear perspective view of the machine (1) of the present invention according to a second preferred embodiment. As shown therein, the machine comprises the following:
- a hopper (10) configured to contain a plurality of containers (100) arranged randomly;
- a transfer station (20); and
- a first elevator (30) that has first horizontal blades (31) longitudinally, each of said first blades (21) being configured to collect a first container (101) from the hopper (10) and lift the same in a horizontal position to the transfer station (20).

Said machine is characterized in that it comprises:
- a second elevator (40), parallel to the first elevator (30), that has second horizontal blades (41) longitudinally, each of said second blades (41) being configured to collect a second container (102) from the hopper (10) and lift the same in a horizontal position to the transfer station (20); and
- an alignment station (50) configured to receive the first (101) and second containers (102) coming from the transfer station (20) and supply the same horizontally in an aligned manner.

As shown therein, the hopper (10) comprises the following:
- a supply receptacle (11) configured to supply containers (100) to the first (30) and second elevator (40); and
- a replenishment receptacle (12) configured to supply containers (100) to the supply receptacle (11).

The containers (100) deposited in the replenishment receptacle (12) are transferred to the supply receptacle (11) by means of a motorized conveyor belt (13), also having a steering panel (14) that causes the drop of the containers (100) into the supply receptacle (11).

Figure 8:
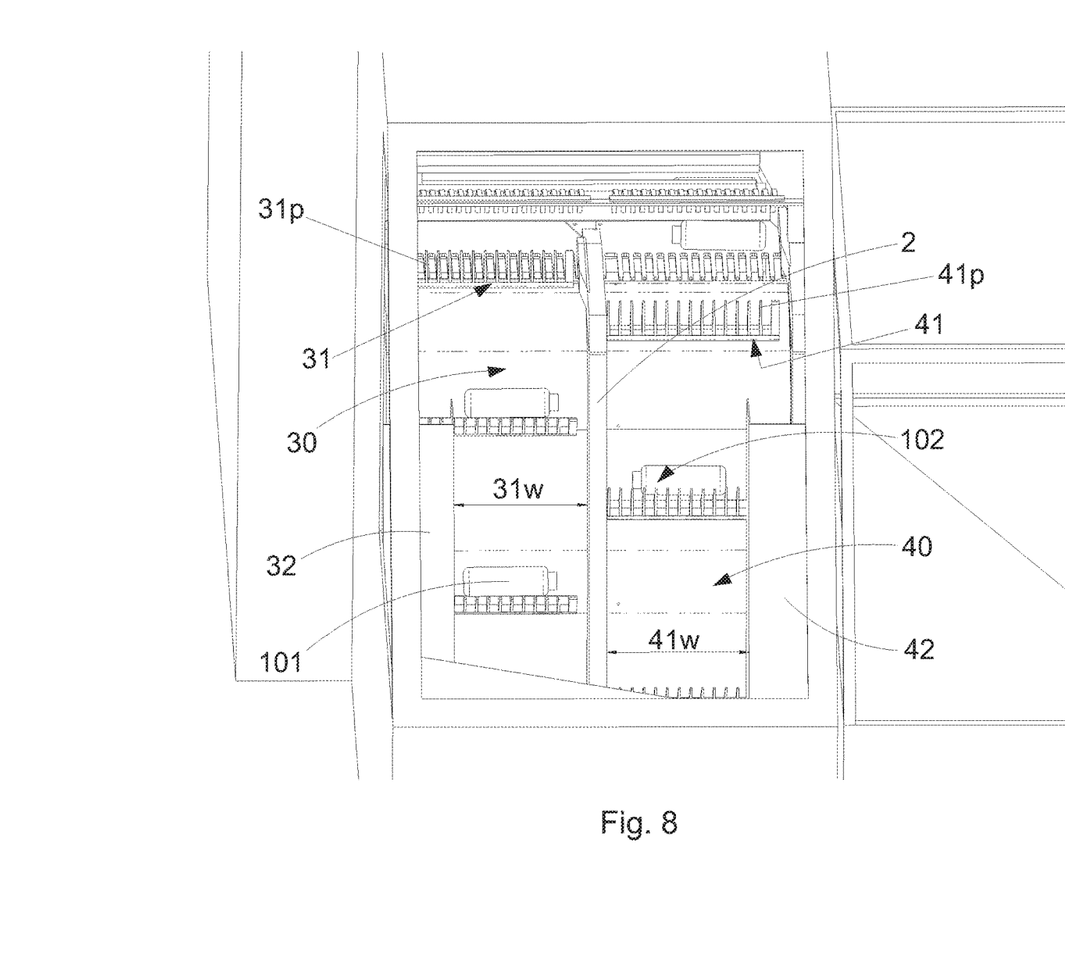
FIG. 8 represents a perspective view of the first and second elevator according to a second preferred embodiment.

FIG. 8 shows a perspective view of the first (30) and second elevator (40) according to the second preferred embodiment. As shown therein, the first elevator (30) comprises a first separator (32) configured to partially cover the first blades (31) and establish a first effective collection width (31w) thereof, while the second elevator (40) comprises a second separator (42) configured to partially cover the second blades (41) and establish a second effective collection width (41w). Said first (31w) and second effective collection widths (41w) are established such that each of them is lower than twice the length of the container itself, noting that two containers (101, 102) do not fit in the same blade (31, 41) simultaneously. Likewise, there is also a central barrier (2) arranged between the first elevator (30) and second elevator (40).

The first (31) and second blades (41) are flexible, configured in the form of a claw by first spikes (31p) and second spikes (41p), respectively.

According to this second preferred embodiment of the machine (1), the first blades (31) alternate horizontally with respect to the second blades (41). That is to say, their position in height does not match.

Figure 9:
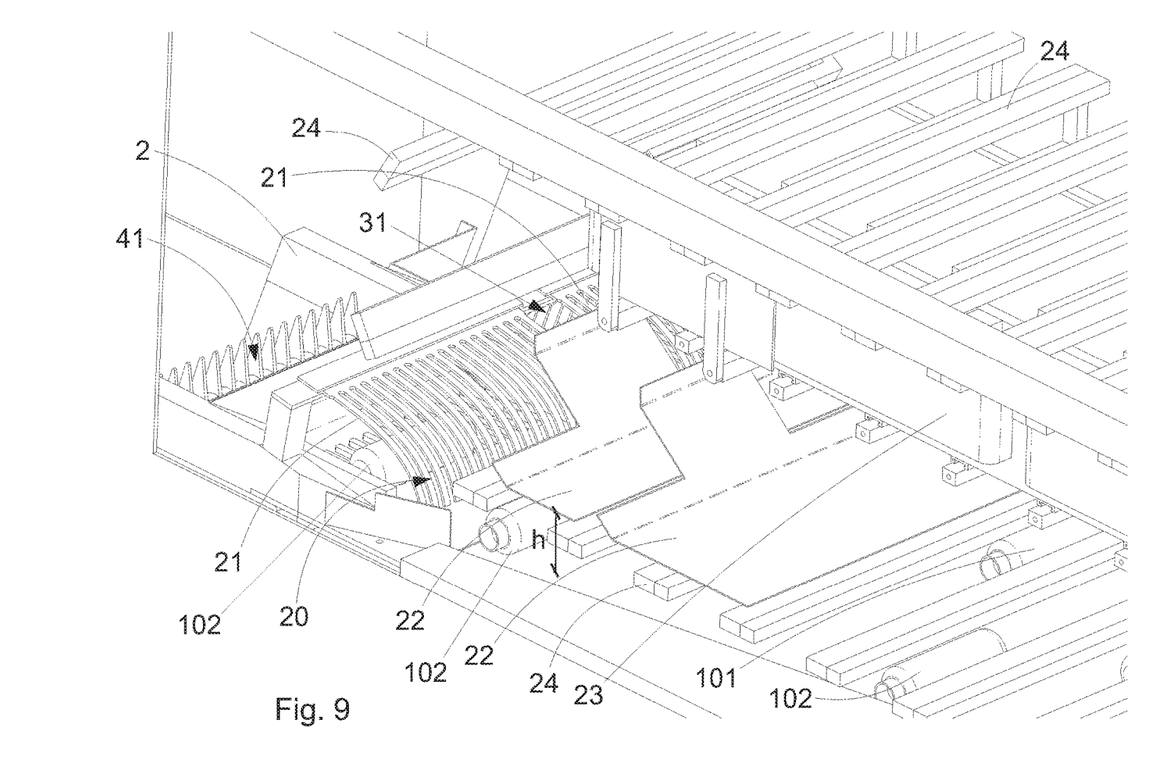
FIG. 9 represents a perspective view of the transfer station according to a second preferred embodiment.

FIG. 9 shows a perspective view of the transfer station (20) according to the second preferred embodiment. As shown therein, the transfer station (20) comprises a holdback screen (21) configured to hold back the forward motion of a first (101) and a second container (102), respectively delivered by a first (31) and a second blade (41). Said containers (101, 102) roll freely along a transfer ramp (25) that goes downwards in the forward direction, to be held at the holdback screen waiting for the blades (31, 41) to push them forward a brief moment later. Thus, the first (101) and/or the second container (102) recently delivered by a first (31) and/or a second blade (41) is momentarily held back, long enough, waiting for the first (101) and/or the second container (102) delivered just prior to be removed. That is to say, as shown therein, a certain spacing is maintained during the transfer process among the containers being delivered, preventing the same from entering into contact with the containers that have been delivered just prior.

The transfer station (20) comprises an upper control plate (22), which height may be adjusted, configured to establish a height of passage (h) of the first (101) and second containers (102) towards the alignment station (50). The foregoing prevents any of the containers (101, 102) from being occasionally ejected after passing through the holdback screen (21).

Likewise, the transfer station (20) comprises a horizontal transporter (23), which in turn has a plurality of pushing fins (24) arranged in parallel with respect to the first (31) and second blades (41). The pushing fins (24) are configured to rotate perimetrally around the transporter (23) and to pass below the upper control plate (22), which is also assembled in the transporter (23), making possible the collection of a first (101) and a second container (102) coming from the holdback screen (21) and the transfer thereof along the alignment station (50). Both the upper control plate (22) and the pushing fins (24) have an extractable configuration and are interchangeable with other plates and/or fins with different configurations and sizes, having guiding and attachment means that allow the fast extraction and subsequent assembly thereof to achieve the foregoing.

Figure 10:
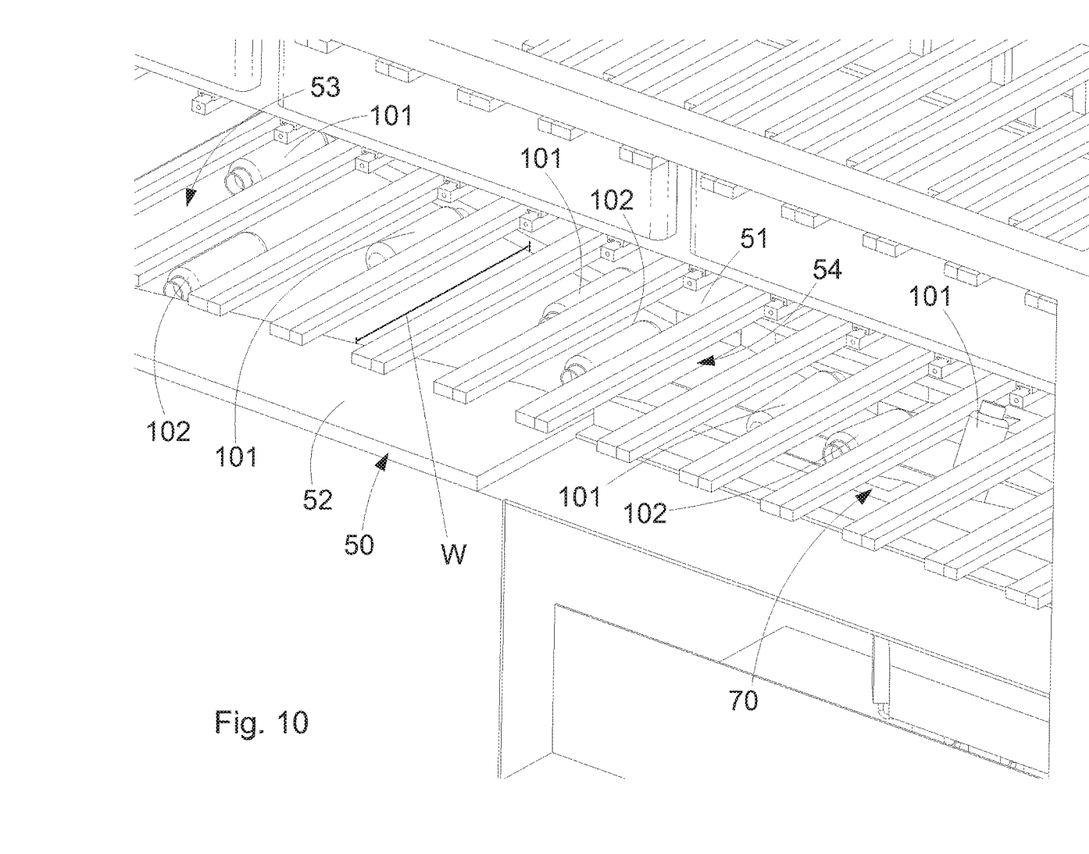
FIG. 10 represents a perspective view of the alignment station according to a second preferred embodiment.

FIG. 10 shows a perspective view of the alignment station (50) according to the second preferred embodiment. As shown therein, the alignment station (50) comprises an inner wall (51) and an outer wall (52) that are opposite to each other and delimit a width of passage (w) of the first (101) and second containers (102), where said width of passage (w) decreases from an entry area (53) that is connected to the transfer station (20) as far as an exit area (54) that allows the passage of a single first (101) or second container (102). This way, at the end of the exit area, the first (101) and second containers (102) form a line one by one, arranged horizontally one after the other.

This second embodiment does not generate the rejection of containers (101, 102), given that the same pushing fin can never collect a first (101) and a second container (102) simultaneously. The foregoing is because the delivery of containers of the first (31) and second blades (41) is carried out in an alternate manner.

The machine (1) comprises a positioning station (70) arranged at the end of the alignment station (50), FIG. 6, configured to position the first (101) and second containers (102) in a vertical position and aligned on an output conveyor belt (80). The containers (101, 102) are supported on their base and leave their neck at the upper end.

The invention claimed is:

1. A machine for supplying containers comprising:
   a hopper configured to contain a plurality of containers arranged randomly;
   a common transfer station; and
   a first elevator that has first horizontal blades longitudinally, each of said first blades being configured to collect a first container from the hopper and lift the same in a horizontal position to the common transfer station; and
   a second elevator, parallel to the first elevator, that has second horizontal blades longitudinally, each of said second blades being configured to collect a second container from the hopper and lift the same in a horizontal position to the common transfer station;
   wherein a single alignment station is configured to receive both the first and second containers coming from the common transfer station in a transverse position to the forward direction of said containers, and supply the same horizontally in an aligned manner.

2. The machine for supplying containers according to claim 1, wherein the hopper comprises:
   a supply receptacle configured to supply containers to the first and second elevator; and
   a replenishment receptacle configured to supply containers to the supply receptacle.

3. The machine for supplying containers according to claim 1, wherein the first elevator comprises a first separator configured to partially cover the first blades and establish a first effective collection width thereof, and the second elevator comprises a second separator configured to partially cover the second blades and establish a second effective collection width.

4. The machine for supplying containers according to claim 1, further comprising a central barrier arranged between the first elevator and the second elevator.

5. The machine for supplying containers according to claim 1, wherein the first and second blades are flexible, configured in the form of a claw by first spikes and second spikes, respectively.

6. The machine for supplying containers according to claim 1, wherein the common transfer station comprises an upper control plate, which height may be adjusted, configured to establish a height of passage (h) of the first and second containers towards the single alignment station.

7. The machine for supplying containers according to claim 1, wherein the common transfer station comprises a horizontal transporter, which in turn has a plurality of pushing fins arranged in parallel with respect to the first and second blades.

8. The machine for supplying containers according to claim 1, wherein the first blades alternate horizontally with respect to the second blades.

9. The machine for supplying containers according to claim 1, further comprising a positioning station arranged at the end of the single alignment station, configured to position the first and second containers in a vertical position and aligned on an output conveyor belt.

10. The machine for supplying containers according to claim 1, wherein the single alignment station comprises an inner wall and an outer wall that are opposite to each other and delimit a width of passage (w) of the first and the second containers, where said width of passage (w) decreases from an entry area that is connected to the common transfer station as far as an exit area that allows the passage of a single first or second container.

11. The machine for supplying containers according to claim 10, wherein the recovery ramp slopes down from an opening in the outer wall, located before the exit area, and ends at a recovery receptacle configured to supply the recovery elevator.

12. The machine for supplying containers according to claim 1, wherein the common transfer station comprises a holdback screen configured to hold back the forward motion of a first and a second container, respectively delivered by a first and a second blade.

13. The machine for supplying containers according to claim 12, wherein the pushing fins are configured to rotate perimetrally around the transporter and to pass below the upper control plate, making possible the collection of a first and a second container coming from the holdback screen and the common transfer thereof along the single alignment station.

14. The machine for supplying containers according to claim 1, wherein the first blades are horizontally aligned with respect to the second blades.

15. The machine for supplying containers according to claim 14, further comprising a recovery station, the recovery station comprising:
   a recovery ramp attached to the single alignment station; and
   a recovery elevator configured to receive a first or a second container coming from the recovery ramp and return it to the hopper.

* * * * *